United States Patent
Glover et al.

(10) Patent No.: US 9,897,332 B2
(45) Date of Patent: Feb. 20, 2018

(54) ENERGY EFFICIENT FENESTRATION ASSEMBLY

(71) Applicants: Michael Glover, Perth (CA); Stephen Field, Ottawa (CA); Marvin Davis, New Philadelphia, OH (US); Gregory Allen, Odessa (CA)

(72) Inventors: Michael Glover, Perth (CA); Stephen Field, Ottawa (CA); Marvin Davis, New Philadelphia, OH (US); Gregory Allen, Odessa (CA)

( * ) Notice: Subject to any disclaimer, the term of this patent is extended or adjusted under 35 U.S.C. 154(b) by 33 days.

(21) Appl. No.: 14/421,028

(22) PCT Filed: Aug. 12, 2013

(86) PCT No.: PCT/CA2013/000703
§ 371 (c)(1),
(2) Date: Feb. 11, 2015

(87) PCT Pub. No.: WO2014/026268
PCT Pub. Date: Feb. 20, 2014

(65) Prior Publication Data
US 2015/0219344 A1  Aug. 6, 2015

Related U.S. Application Data

(63) Continuation-in-part of application No. 13/572,625, filed on Aug. 11, 2012, now abandoned.

(51) Int. Cl.
*F24D 15/02* (2006.01)
*F24D 5/02* (2006.01)
(Continued)

(52) U.S. Cl.
CPC ............. *F24D 15/02* (2013.01); *E05D 15/08* (2013.01); *E05F 15/00* (2013.01); *E06B 1/36* (2013.01); *E06B 3/4609* (2013.01); *E06B 3/50* (2013.01); *E06B 3/5454* (2013.01); *E06B 3/6612* (2013.01); *E06B 3/6715* (2013.01); *E06B 3/6722* (2013.01); *E06B 7/02* (2013.01);
(Continued)

(58) Field of Classification Search
CPC ............................... E06B 3/4654; F24D 15/02
See application file for complete search history.

(56) References Cited

U.S. PATENT DOCUMENTS 690,252 A   12/1901  Ennis
1,289,856 A  12/1918  Maxim
(Continued)

FOREIGN PATENT DOCUMENTS

AT     400063 B    9/1995
CN    2185784 Y   12/1994
(Continued)

*Primary Examiner* — Katherine W Mitchell
*Assistant Examiner* — Catherine A Kelly
(74) *Attorney, Agent, or Firm* — Michael Crilly, Esquire

(57) ABSTRACT

A fenestration assembly comprising a sliding glass assembly that slides between a fully closed position and a fully open position in which the sliding glass assembly is received into a pocket of the fenestration assembly. The pocket is covered on at least one side with insulation. The fenestration assembly may have two sliding glass assemblies. The fenestration assembly may be used in an energy efficient building system.

26 Claims, 18 Drawing Sheets

(51) Int. Cl.
| | |
|---|---|
| *F24D 11/00* | (2006.01) |
| *F24F 11/00* | (2018.01) |
| *F24F 5/00* | (2006.01) |
| *F24D 11/02* | (2006.01) |
| *F24D 19/10* | (2006.01) |
| *E06B 9/24* | (2006.01) |
| *E06B 9/264* | (2006.01) |
| *E06B 9/30* | (2006.01) |
| *E05D 15/08* | (2006.01) |
| *E05F 15/00* | (2015.01) |
| *E06B 1/36* | (2006.01) |
| *E06B 3/46* | (2006.01) |
| *E06B 3/50* | (2006.01) |
| *E06B 3/54* | (2006.01) |
| *E06B 3/66* | (2006.01) |
| *E06B 3/67* | (2006.01) |
| *E06B 7/02* | (2006.01) |
| *E06B 7/28* | (2006.01) |
| *F24D 15/04* | (2006.01) |
| *F24F 7/00* | (2006.01) |
| *G02F 1/01* | (2006.01) |

(52) U.S. Cl.
CPC ............. *E06B 7/28* (2013.01); *E06B 9/24* (2013.01); *E06B 9/264* (2013.01); *E06B 9/30* (2013.01); *F24D 5/02* (2013.01); *F24D 11/003* (2013.01); *F24D 11/004* (2013.01); *F24D 11/007* (2013.01); *F24D 11/0221* (2013.01); *F24D 11/0264* (2013.01); *F24D 15/04* (2013.01); *F24D 19/1045* (2013.01); *F24D 19/1093* (2013.01); *F24F 5/0017* (2013.01); *F24F 7/00* (2013.01); *F24F 11/0001* (2013.01); *F24F 11/0017* (2013.01); *G02F 1/01* (2013.01); *E06B 2009/2476* (2013.01); *E06B 2009/2643* (2013.01); *F24D 2200/11* (2013.01); *F24F 2005/0057* (2013.01); *F24F 2005/0064* (2013.01); *F24F 2005/0082* (2013.01); *F24F 2007/004* (2013.01); *F24H 2240/09* (2013.01); *Y02B 10/20* (2013.01); *Y02B 10/24* (2013.01); *Y02B 10/40* (2013.01); *Y02B 10/70* (2013.01); *Y02B 30/126* (2013.01); *Y02B 30/78* (2013.01); *Y02E 60/147* (2013.01)

(56) References Cited

U.S. PATENT DOCUMENTS

| | | | |
|---|---|---|---|
| 1,825,162 A * | 9/1931 | Sawyer | E06B 3/18 49/425 |
| 1,927,967 A | 9/1933 | Welsh | |
| 2,196,591 A * | 4/1940 | Kramer | E06B 3/4654 160/114 |
| 2,206,119 A | 7/1940 | Persons | |
| 2,209,263 A | 7/1940 | Gaines | |
| 2,339,315 A * | 1/1944 | Alio | E06B 3/4654 49/228 |
| 2,350,886 A | 6/1944 | Freimann | |
| 2,722,107 A | 11/1955 | Gay | |
| 2,749,724 A | 6/1956 | Borgerd et al. | |
| 2,925,859 A * | 2/1960 | Baker, Jr. | E05B 65/0841 160/26 |
| 2,931,578 A * | 4/1960 | Thompson | E06B 7/06 126/274 |
| 2,971,228 A * | 2/1961 | Szabo | E06B 3/4609 49/209 |
| 3,091,004 A * | 5/1963 | Mays | E06B 3/4654 49/372 |
| 3,199,858 A | 8/1965 | Koblensky | |
| 3,960,322 A | 6/1976 | Ruff | |
| 3,994,276 A | 11/1976 | Pulver | |
| 4,012,920 A | 3/1977 | Kirschbaum | |
| 4,057,937 A * | 11/1977 | Nakamura | E05D 15/08 160/37 |
| 4,064,705 A | 12/1977 | Edwards | |
| 4,125,966 A * | 11/1978 | Penn | E05F 15/649 49/349 |
| 4,182,406 A | 1/1980 | Holbrook et al. | |
| 4,219,971 A * | 9/1980 | Mauroner | E05D 15/08 49/372 |
| 4,267,666 A * | 5/1981 | Davidson | E06B 3/2605 49/370 |
| 4,290,415 A | 9/1981 | Tatsumi | |
| 4,330,020 A * | 5/1982 | Glynn | E06B 9/04 160/90 |
| 4,344,473 A | 8/1982 | Shore | |
| 4,351,476 A | 9/1982 | Rood, Jr. | |
| 4,365,441 A * | 12/1982 | Davidson | E06B 3/2605 49/361 |
| 4,370,826 A * | 2/1983 | Davidson | E06B 3/2605 49/118 |
| 4,385,470 A * | 5/1983 | Bryson | E06B 5/11 49/372 |
| 4,517,958 A | 5/1985 | Wolf | |
| 4,578,912 A | 4/1986 | Ericsson | |
| 4,773,309 A | 9/1988 | Walters | |
| 4,955,285 A | 9/1990 | Geilinger et al. | |
| 5,107,649 A | 4/1992 | Benson | |
| 5,873,205 A * | 2/1999 | Hanlon | E04B 2/7416 49/158 |
| 6,429,961 B1 | 8/2002 | Harary et al. | |
| 6,752,713 B2 | 6/2004 | Johnson, Jr. | |
| 6,843,718 B2 | 1/2005 | Schmitz | |
| 6,936,347 B2 | 8/2005 | Laird et al. | |
| 6,952,897 B1 * | 10/2005 | Mauer | E06B 3/4654 49/413 |
| 7,147,168 B1 | 12/2006 | Bagwell et al. | |
| 7,441,558 B2 | 10/2008 | Leifer | |
| 7,845,142 B2 * | 12/2010 | Theios | E06B 1/26 52/204.6 |
| 7,851,034 B2 * | 12/2010 | Cooper | E06B 3/6612 428/212 |
| 8,165,719 B2 * | 4/2012 | Kinney | E06B 7/08 318/266 |
| 2002/0189173 A1 | 12/2002 | Staschik | |
| 2003/0024167 A1 * | 2/2003 | Cheng | E06B 3/4423 49/374 |
| 2004/0209567 A1 | 10/2004 | Schmitz | |
| 2006/0185383 A1 | 8/2006 | Schilling | |
| 2007/0148379 A1 * | 6/2007 | Theios | E06B 3/6612 428/34 |
| 2008/0029226 A1 | 2/2008 | Huang | |
| 2008/0155914 A1 * | 7/2008 | Schlabach | E06B 1/006 52/211 |
| 2008/0216966 A1 | 9/2008 | Ben-David | |
| 2009/0121488 A1 | 5/2009 | Bhatti et al. | |
| 2009/0173037 A1 | 7/2009 | Leo | |
| 2009/0260776 A1 | 10/2009 | Calamaro | |
| 2010/0004790 A1 | 1/2010 | Harbin, III | |
| 2010/0038441 A1 | 2/2010 | Pedersen | |
| 2010/0300645 A1 | 12/2010 | Glover | |
| 2011/0041536 A1 | 2/2011 | O'Brien | |
| 2011/0167741 A1 * | 7/2011 | Surace | E06B 3/645 52/204.1 |
| 2012/0205456 A1 | 8/2012 | Honma | |

FOREIGN PATENT DOCUMENTS

| | | |
|---|---|---|
| CN | 200949390 Y | 9/2007 |
| CN | 201280876 Y | 7/2009 |
| CN | 201396984 Y | 2/2010 |
| DE | 3801199 A1 | 7/1989 |
| FR | 1057938 A | 3/1954 |
| GB | 1504508 A | 3/1978 |
| GB | 2358658 A | 8/2001 |

(56) References Cited

FOREIGN PATENT DOCUMENTS

| | | | |
|---|---|---|---|
| JP | 61-237940 | 10/1986 | |
| KR | 101046540 B1 | 7/2011 | |
| WO | WO 2007138365 A1 * | 12/2007 | ......... E05B 65/0864 |

* cited by examiner

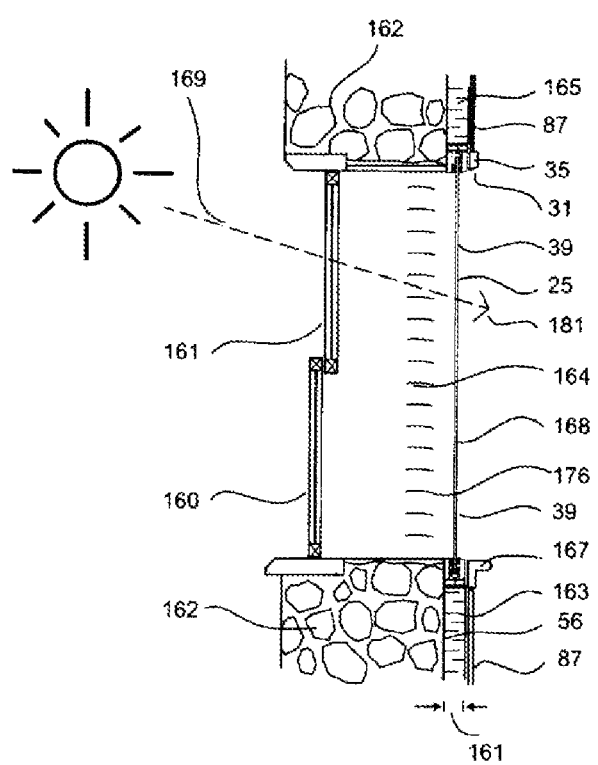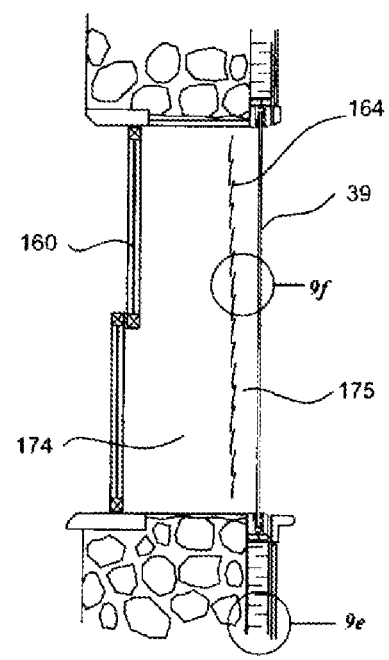
FIG. 9a          FIG. 9b

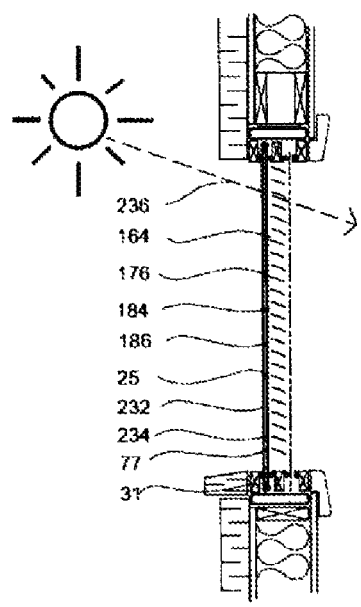 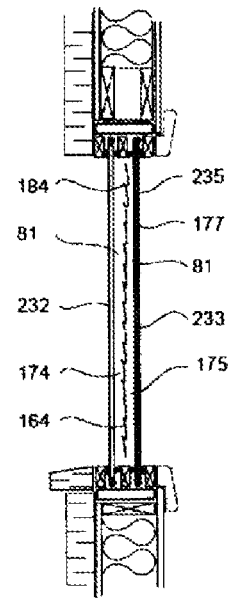
*FIG. 13a*  *FIG. 13b*
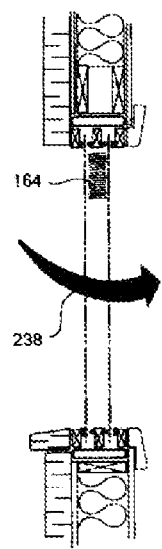 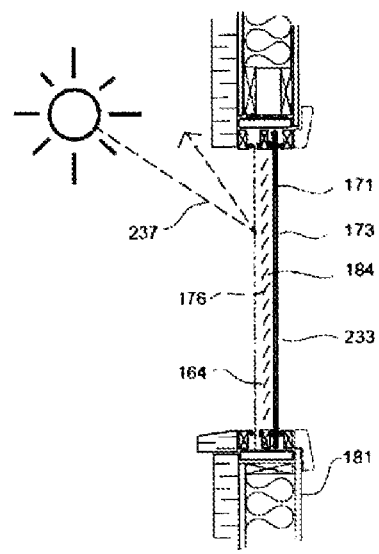
*FIG. 13c*  *FIG. 13d*

ENERGY EFFICIENT FENESTRATION ASSEMBLY

CROSS REFERENCE TO RELATED APPLICATIONS

This application is a National Phase of Patent Cooperation Treaty Application No. PCT/CA2013/000703 entitled Energy Efficient Fenestration Assembly filed 12 Aug. 2013 which further claims priority from U.S. patent application Ser. No. 13/572,625 filed 11 Aug. 2012 entitled Building Energy System. The present application is a continuation-in-part of U.S. patent application Ser. No. 13/572,625. The subject matters of the prior application are incorporated in their entirety herein by reference thereto.

FEDERALLY SPONSORED RESEARCH AND DEVELOPMENT

None

BACKGROUND OF THE INVENTION

1. Field of the Invention

This invention relates to fenestration assemblies for both new and retrofit construction and in particular to energy efficient fenestration assemblies.

2. Background

Over the past forty years, the energy efficiency of windows has been significantly improved. One key technological improvement has been the development of low-emissivity coatings with sputtered low-e coatings offering the highest performance. Generally, there are two main types of sputtered coatings: solar control and solar gain. Comparing the two coatings, the emissivity of the solar control coating is lower resulting in reduced heat loss. However in a comparison study by the National Research Council of Canada using side-by-side test house monitoring, the study showed that with solar gain low-e coatings overall building energy consumption is 10 percent lower because of higher direct solar gains during the heating season. Although during the cooling season because of higher solar gains, building energy consumption is higher with solar gain low-e coatings.

Typically because of durability concerns, high performance sputtered coatings have to be located on the cavity glass surfaces of an insulating glass unit. However recently, more durable sputtered low-e coatings have been developed that can be used on exterior surfaces and by adding an exterior low-e coating to the outer interior surface of a double glazed unit, center-of-glass insulating performance is typically increased from R-4 to R-5.

Vacuum insulating glass (VIG) is an energy efficient window product that can provide outstanding center-of-glass insulating performance. With vacuum insulating glass, there is minimal heat loss through convection or conduction across the small vacuum cavity and the main heat loss source is through radiation. By using an ultra low emissivity coating, radiation heat loss can be reduced to a minimum and this can provide for R-15 center-of-glass performance for a double-glazed unit. However with a high performance solar control coating on surface two (glazing surfaces numbered from the exterior), direct solar heat gains through south-facing windows can be substantially reduced during the heating season and this lowers overall window energy performance.

As well in order to maintain the vacuum within the VIG unit, the two glass sheets are fused together at the edge resulting in a substantially lower R-value around the perimeter edge, for example about R-1. If the VIG unit is installed in a conventional window frame, R-value performance is further downgraded and so despite the impressive center-of-glass R-value performance, overall window performance is not substantially higher than with a conventional double glazed window.

SUMMARY OF THE INVENTION

In accordance with the present disclosure, there is provided a fenestration assembly for enclosing an opening in a building wall, the fenestration assembly comprising: a frame having at least four edges surrounding first and second sides to be partially covered by building material, the frame defining: an opening from the first side to the second side; and a first pocket section next to the opening and sized at least equally to the opening; an insulating section between the first pocket section and one of the first or second sides of the frame; and a first sliding glass assembly within the frame capable of sealing the opening and moveable between: a fully-closed position in which the first sliding glass assembly is located substantially within the opening and seals the opening; and a fully-open position in which the first sliding glass assembly is located substantially within the first pocket section of the frame.

In accordance with the present disclosure, there is further provided 46. A building energy system comprising: a building enclosure having an interior and exterior, the building enclosure comprising at least one wall separating the interior and exterior and comprising an opening; a fenestration assembly enclosing the opening in the wall, the fenestration assembly comprising: a frame having at least four edges surrounding first and second sides partially covered by building material, the frame defining: an opening from the first side to the second side; and a first pocket section next to the opening and sized at least equally to the opening; an insulating section between the first pocket section and one of the first or second sides of the frame; and a first sliding glass assembly within the frame capable of sealing the opening and moveable between: a fully-closed position in which the first sliding glass assembly is located substantially within the opening and seals the opening; and a fully-open position in which the first sliding glass assembly is located substantially within the first pocket section of the frame.

BRIEF DESCRIPTION OF THE DRAWINGS

The following is a description by way of example of certain embodiments of the present invention, reference being made to the accompanying drawings.

FIGS. 9a, 9b, 9c, 9d, 9e, 9f show a series of vertical cross sections and related details of the fenestration assembly as shown in FIG. 1 overlapping a traditional single hung window and installed on the interior side of a masonry wall retrofitted with additional insulation and where the fenestration components including a Venetian blind are positioned in different seasonal modes of operation.

FIGS. 13a, 13b, 13c, 13d show a series of vertical diagrammatic cross sections on a line 10a-10a of the fenestration assembly as shown in FIG. 10 with the sliding, sash units and the Venetian blind in different seasonal modes of operation.

DETAILED DESCRIPTION

Figure 1:
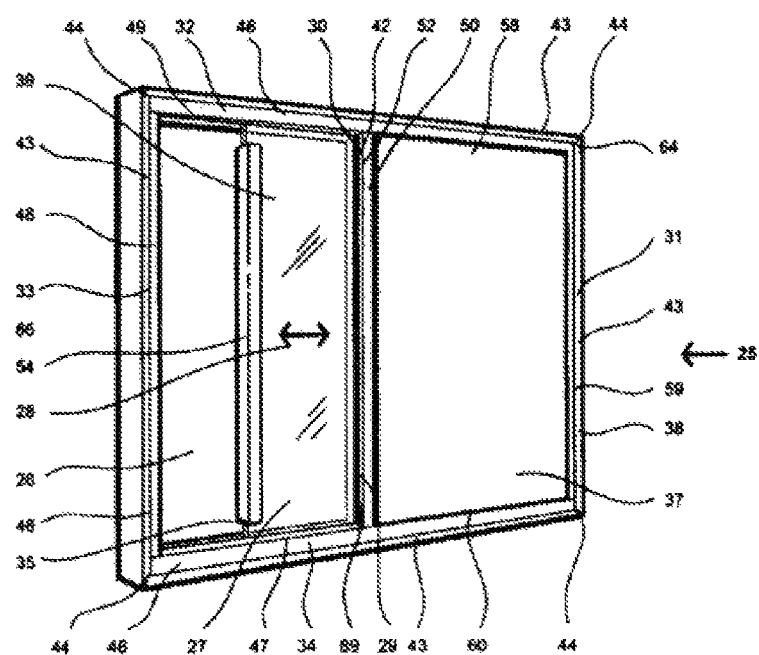
FIG. 1 shows a perspective view of a fenestration assembly that incorporates a pocket window frame and a horizontal sliding, vacuum insulating glass (VIG) unit and that moves back and forth into a cavity that forms part of the pocket window frame.

Referring to the drawings, FIG. 1 shows a perspective view of a fenestration assembly 25 incorporating an opening 26 and a horizontal sliding glazing sub assembly 27 that overlaps the opening 26 in a closed position. As shown by the arrow 28, the glazing sub assembly 27 can move back and forth into a cavity pocket 29 that is located on one vertical edge 30 of the opening 26. The cavity pocket 29 forms part of a pocket frame 31 that is also comprised of an outer frame sub assembly 38 that surrounds both the opening 26 and the cavity pocket 29. Insulating walls 36 (not shown), 37 are located on either side of the cavity pocket 29 and are attached to the outer frame sub assembly 38. Insulating mullions 51 (not shown), 52 are located adjacent to the vertical edge 30 and are spaced apart to form a slot 42. Insulating inserts 45 (not shown), 46 are located on the other three edges 47, 48, 49 of the opening 26 and overlap the glazing sub assembly 27 when the sub assembly 27 is in a closed position.

Specifically the glazing sub assembly 27 as shown in FIG. 1 is a vacuum insulating glass (VIG) unit 39. Although the insulating performance of the VIG center-of-glass 66 can be as high as R-15, the insulating performance of the VIG perimeter edges 35 is poor, typically about R-1. When the VIG unit 39 is in a closed position, the conductive perimeter edges 35 are buried within the three insulating edge pockets 32, 33, 34 and the insulating mullion edge pocket 89 that forms part of the cavity pocket 29. As a result, perimeter heat loss is substantially reduced and overall energy performance is enhanced.

The outer sub frame 38 of the pocket frame 31 is typically fabricated from narrow hollow profiles 43 that can be made from a variety of materials, including: fiberglass, polyvinyl chloride (PVC), PVC foam and thermally broken aluminum. Depending on the framing material used, various techniques can be utilized to join the sub frame profiles 43 at the corners 44. No specific jointing technique is shown in FIG. 1. Insulating walls are located 36, 37 on either side the cavity pocket 29 and can be attached to the outer frame using various means and again no specific technique is shown in FIG. 1.

On the interior side, the insulating inserts 46 and insulating mullion inserts 52 are removable and this allows the VIG unit 39 to be taken out as required for repair or replacement. The insulating inserts 45 (not shown), 46 and mullions 51 (not shown), 52 can be made from various insulating material combinations, including: PVC hollow profiles PVC foam with an integral skin and foam-filled fiberglass pultrusions. Depending on the material combination used, various jointing techniques can be utilized to attach the insulating inserts 45 (not shown), 46 and mullions 51 (not shown), 52 to the outer frame sub assembly 38 and to the insulating walls 36 (not shown), 37 of the cavity 29.

A slim line U-channel profile 54 is adhered the perimeter edge 35 of the VIG unit 39 using sealant material (not shown). Part of the locking mechanism (not shown) is attached to the stile profile 54 while the complementary cam lock (not shown) is attached in part to the outer frame 38. Typically, a collapsible handle or finger pull (not shown) is directly attached to the VIG unit 39.

As shown by arrow 28, the VIG unit 39 can be moved horizontally back and forth either manually or through a motorized process that typically involves a motor in a fixed location with various mechanical means used for moving the unit back and forth, including: ball screws, cog tracks, cables, rotary handles and the like.

Typically, the fenestration assembly 25 is prefabricated in a factory to strict quality standards. Specifically edge joints 64 in the pocket frame 31 are carefully sealed and this helps ensure that when the fenestration assembly 25 is retrofitted to the interior side of a building opening, there is no air leakage to the outside and when the fenestration assembly 25 is retrofitted to the exterior side of a building opening, there is no water penetration to the inside.

After the fenestration assembly 25 has been installed in a building, removable window trim (not shown) can be added. The removable trim is joined together at the corners with special connectors (not shown). One option is for the removable trim to be made from PVC foam material and by overlapping the removable inserts 46 and removable mullion insert 52. The PVC foam window trim provides additional edge insulation that further prevents perimeter heat loss. In addition, the window trim can provide for additional structural rigidity for the slot mullion assembly 42.

Although a VIG unit 39 is shown in FIG. 1, other types of sliding glazing sub-assemblies can be substituted including: conventional insulating glass units, laminated glass sheets, window sashes and patio doors.

Figure 2:
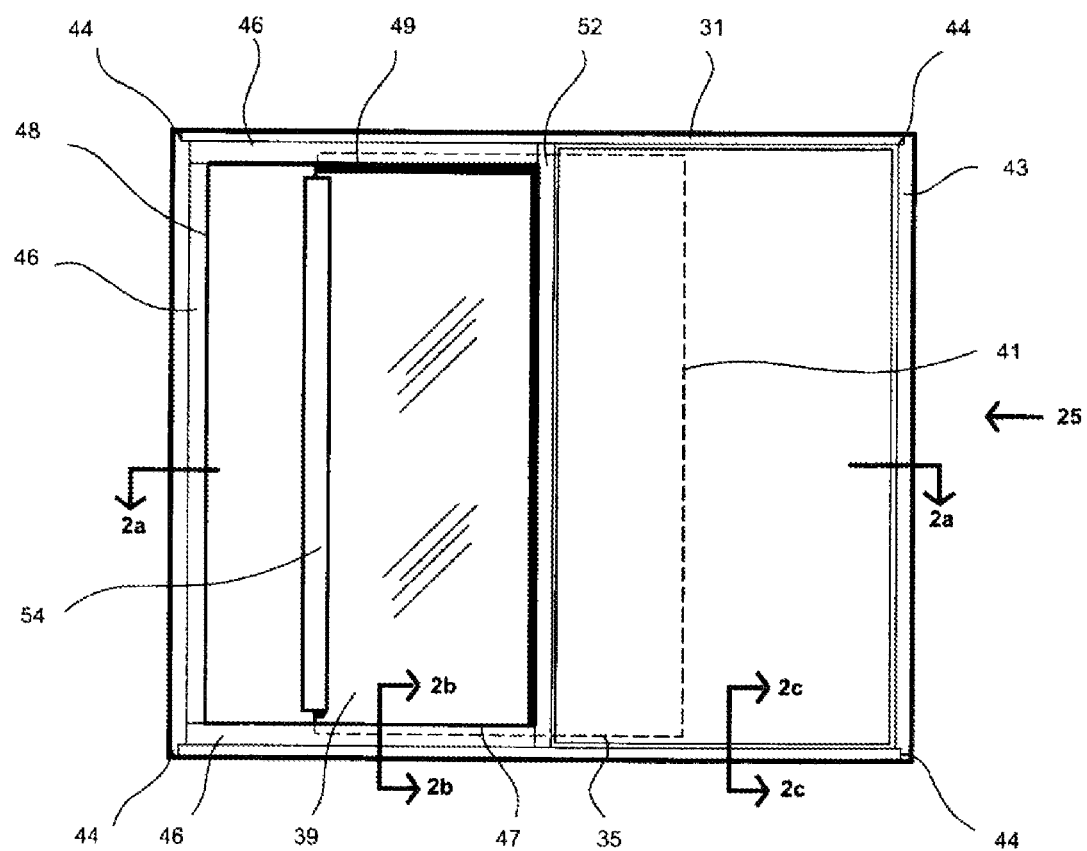
FIG. 2 shows an elevation view of a fenestration assembly as shown in FIG. 1 with the horizontal VIG unit in a half open positioned.

FIG. 2 shows an elevation view of the fenestration assembly 25 as described in FIG. 1 with the horizontal sliding VIG unit 39 in a half closed position. When the VIG unit 39 is in a closed position, the pocket frame 31 overlaps all four sides 47, 48, 49, 50 of the VIG unit. The perimeter edge 35 of the VIG unit 39 is shown by the dotted line 41.

Figure 3:
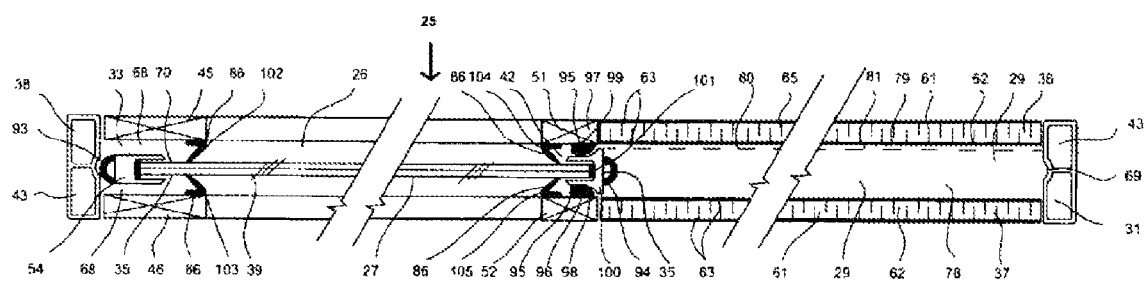
FIG. 3 shows a horizontal cross section on a line 2a-2a of the fenestration assembly as shown in FIG. 2.

FIG. 3 shows a horizontal cross section detail on a line 2a-2a through the fenestration assembly 25 as shown in FIG. 2 with the horizontal sliding VIG unit 39 in a fully closed position. In a fully open position, the VIG unit 39 is received within a cavity pocket 29.

The insulating walls 36, 37 on either side of the cavity pocket 29 can be made from various insulating materials with one option being a stressed skin panel assembly 61 consisting of an insulating inner core 62 adhered to outer structural sheets 63. The insulating core 62 of the stressed skin panel 61 can be made from a variety of plastic foam materials with polyurethane, and extruded or expanded polystyrene being suitable materials. In case of expanded polystyrene, the foam material may be fabricated in large blocks and precut to size using CNC equipment.

The structural skins 63 can be made from a variety of structural sheet materials, including: galvanized steel, cardboard/plastic board, wood sheathing, plywood, glass fiber reinforced sheeting etc. The stressed skin panels 61 are attached to outer frame sub assembly 38 on three sides 58, 59, 60 (See FIG. 1) and this helps square the outer frame assembly 38 and also helps provide rigidity to the mullion slot assembly 42. Depending on the stressed skin panel materials that are used, the width of the stressed skin panel 61 can be as little as 0.5 inch although for higher insulating performance and increased stiffness it may be desirable that the panel width is a minimum of 0.75", or more such as 1" in width. To further improve the insulating performance of the cavity portion 78 of the pocket frame 31, one of the cavity wall surfaces 79 may be covered by foil 80 with a low-emissivity surface finish 81.

A further option is for the stressed skin panel 61 to incorporate a vacuum insulating panel (VIP) 65 as the center insulating core 62. VIPs 65 are typically manufactured from an insulating flat sheet of matrix material that is packaged in a metalized multilayer barrier film material. The matrix material can be made from various insulating materials with one suitable material being fumed silica. Compared to the other matrix materials, the fumed silica has the advantage that there is no need to incorporate additional desiccant and getter materials. Dow Corning manufactures a VIP panel incorporating a silica matrix and the company predicts that after thirty years, the product will retain more than eighty percent of its initial R-35 insulating performance.

To provide for the required structural stiffness, the VIP panel 65 can be adhered to structural stressed skins 63 and one suitable structural skin material is galvanized sheet metal. Various adhesives can be used to adhere the outer structural skins to the VIP panel inner foam core with one option being acrylic pressure sensitive adhesive. A second option is to use dabs of silicone sealant located about 2 to 3 inches apart and this generally provides for improved long term durability.

When retrofitting the fenestration assembly 25 to the interior wall of an existing building, it may be desirable that the pocket frame width 82 is kept to a minimum in order to ensure that the least amount of interior space is lost. Generally for a VIG glazing assembly, 2¾ inches is the minimum pocket frame width 82 that is technically feasible. This width includes a pre-applied plaster board 87 (not shown) over the cavity pocket 29.

For a minimum pocket frame width 82 of 2.25 inches, the fenestration assembly 79 includes: a 0.25 inch wide plaster board 87 (not shown) with a cardboard backing; a 0.75 inch wide insulating stressed skin foam panel 61 with a low-e coating foil 81 that functions as a structural skin 63 adhered to the foam core 62; a 0.75 inch wide cavity pocket 29 for the VIG unit 39, and a 0.5 inch wide VIP panel 65 sandwiched between metal protective sheets 63. The combined R value of the cavity pocket assembly 79 is about R-22 and as described in FIG. 9, this is about the same as the combined center-of-glass R-value for a VIG unit 39 retrofitted to an existing single glazed window and incorporating a Venetian blind assembly.

The hollow frame profile 43 of the outer frame 38 may be made from polyvinyl chloride (PVC) material and incorporates a groove 69. Insulating inserts 45, 46 are attached to the outer frame 38 using snap fit connections (not shown). The insulating inserts 45, 46 on the stile side of the of the pocket frame 31 may have greater depth in order to accommodate the stile frame profile 54. Generally, the insulating inserts 45, 46 create an extended thermal conductive path where heat from the interior space (not shown) has to travel along the edge portion 70 of the interior glass sheet 72 across the VIG conductive perimeter edge 35 and then along the edge portion 70 of the exterior glass sheet 71. Typically, the width of the edge portions 70 is about two inches.

When the VIG unit 39 is in a closed position, the gaps 68 between the VIG unit 39 and the pocket frame 31 are sealed using compressible rubber seals 85. For sealing the gap 84 between the VIG unit 39 and the vertical jamb 106 of the outer frame 38, advantage is taken of the forward movement of the sliding VIG glazing assembly 39 to cause direct pressure on a flexible compressible D-shaped seal 93 that wraps around frame stile 54. For sealing the gaps 91, 92 between the VIG unit glazing assembly 39 and the vertical split mullions 51, 52, advantage is again taken of the sliding movement of the VIG glazing assembly 39 to cause direct pressure on two flexible wedge seals 95, 96 attached to back corner edges 97, 98 of the mullions 51, 52 by a U-shaped plastic profile 94 with extended nibs 99, 100 adhered to the back face 101 of the VIG unit 39.

To form an insulating edge pocket 33 around the conductive VIG perimeter edge 35, compressible V-shaped seals 86 are attached to the inner top edges 102, 103 of the insulating inserts 45, 46. Similarly to form insulating a mullion edge pocket 89 between the mullion inserts 51, 52, compressible V-shaped seals 86 are attached to the inner top edges 104, 105 of the mullion inserts 51, 52.

Figure 3A:
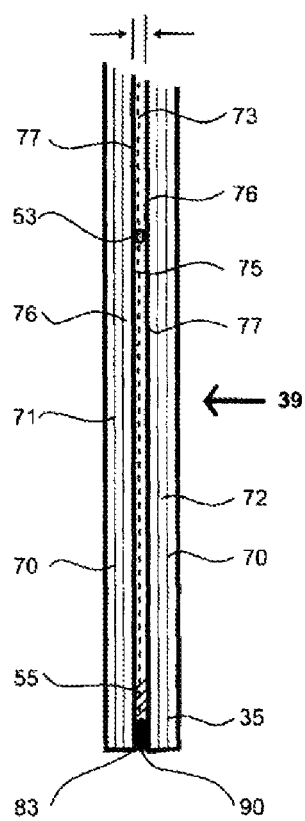
FIG. 3a shows a horizontal cross section detail of the VIG unit as shown in FIG. 3.

As shown in FIG. 3A, the VIG unit 39 is typically comprised of two glass sheets 71, 72 that are separated by tiny spacers 53 that are almost invisible to the human eye. The cavity 73 between the glass sheets 71, 72 is evacuated and a getter (not shown) absorbs any trace amounts of gas remaining. At the VIG perimeter edge 35, the space between the glass sheets 71, 72 is sealed, typically with ceramic frit material 55 that is impermeable. By creating a hard vacuum within the VIG unit 39, conductive and convective heat transfer across the cavity 73 is largely eliminated. The major remaining source of heat loss is through radiative heat transfer and by incorporating an ultra-low emissivity coating 75 on one of the cavity glass surfaces 76, 77 of the VIG unit 39 this radiative heat loss is minimized. To protect the VIG perimeter edges 35 from damage, sealant 90 can be applied in the outward facing perimeter channel 83 with silicone sealant being a suitable material. The perimeter edges 35 of the VIG units 39 can be further protected from accidental damage by means of rubber bumpers (not shown).

Figure 4:
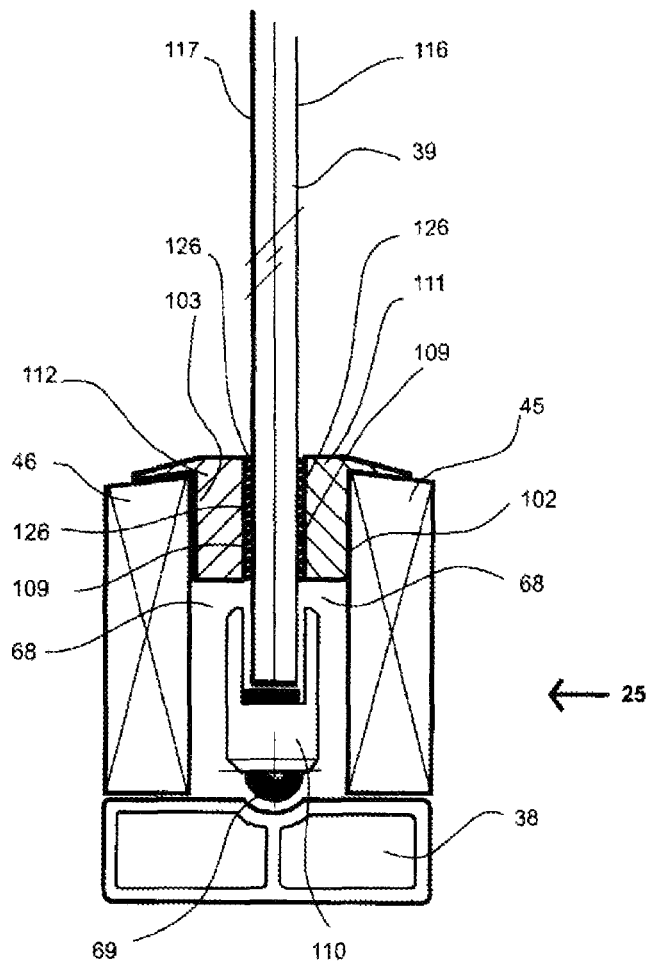
FIG. 4 shows a vertical bottom edge cross section detail on a line 2b-2b of the fenestration assembly as shown in FIG. 2.

FIG. 4 shows a vertical bottom edge cross section detail on a line 2b-2b of the fenestration assembly 25 as shown in FIG. 2. The VIG unit 39 is supported at quarter points by a ball bearing roller cart 110 that moves back and forth in a groove 69 located in the center of the outer frame 38. Compressible rubber seals 111, 112 located at the inner top edges 102, 103 of the insulating inserts 45, 46 seals the gaps 68 between the VIG unit 39 and the insulating inserts 45, 46. To provide an effective seal and to allow the VIG unit 39 to easily slide back and forth, flock tapes 126 are laminated to the front edge 109 of the compressible rubber seals 111, 112.

Figure 5:
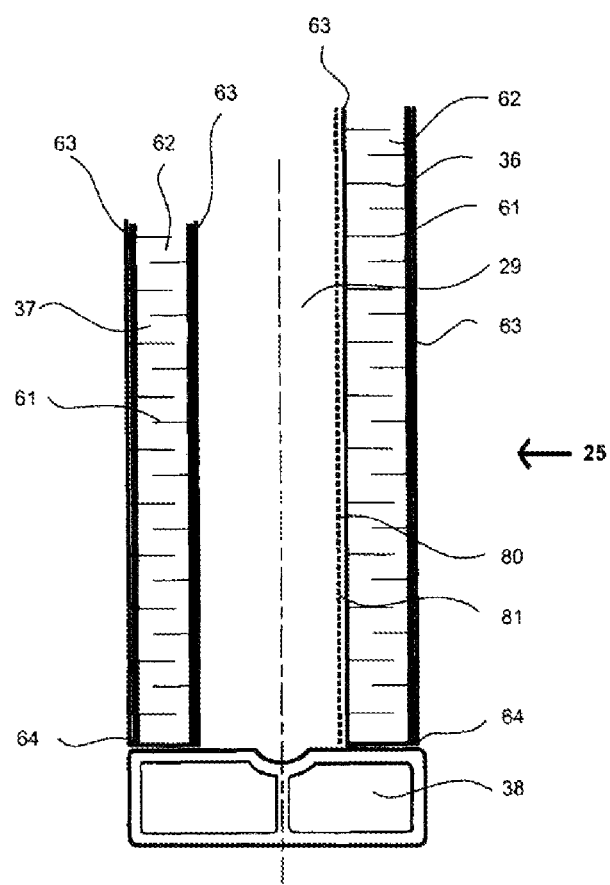
FIG. 5 shows a vertical bottom edge cross section detail on a line 2c-2c of the fenestration assembly as shown in FIG. 2.

FIG. 5 shows a vertical bottom edge cross section detail on a line 2c-2c of the fenestration assembly 25 as shown in FIG. 2. Insulating wall panels 36, 37 are attached to the outer frame 38. To help prevent heat loss across the cavity 29, one of the cavity wall surfaces 113 is covered by foil 80 with a low-emissivity surface finish 81.

As shown in FIGS. 3, 4, and 5 compressible seals 85 are in most cases attached to the outer frame 38, the insulating inserts 45, 46 and the insulating mullions 51, 52. Alternatively, the compressible seals 85 can be attached to the glass assembly 27, particularly for the seals on the vertical insulating inserts 114, 115 and mullion inserts 51, 52, this has the advantage that if the compressible seals 85 become dirty and as the glazing assembly 27 moves in and out of the cavity pocket 29, any dirt on the compressible seals 85 does not dirty the glass surfaces one 116 or four 117 (glass surfaces numbered from the exterior).

Figure 6:
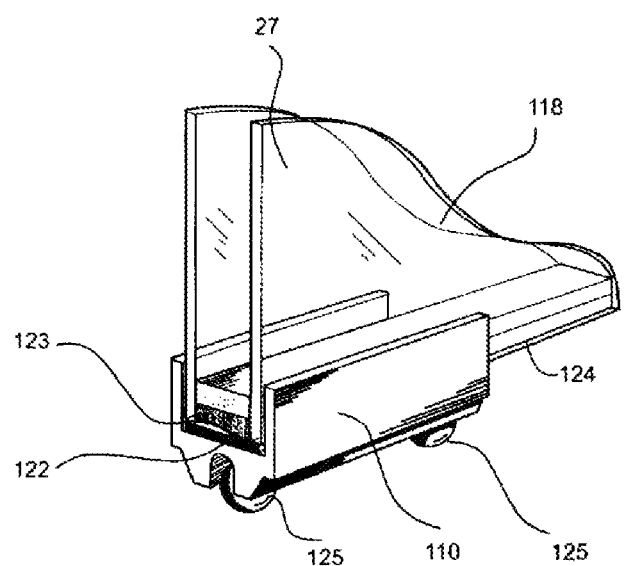
FIG. 6 shows a perspective detail of the ball bearing roller cart for the horizontal sliding, VIG unit as shown in FIG. 1.

FIG. 6 shows a perspective view of the ball bearing roller cart 110 used for supporting the horizontal sliding glazing assembly 27. As shown in FIG. 6, the glazing assembly 27 is a conventional insulating glass unit 118 that is conventionally supported on rubber setting blocks 123. Generally two wheel carts 110 are used to support the insulating glass unit 118 and as with conventional installation practice for supporting insulating glass units with rubber setting blocks, two wheel carts 110 are located at quarter points on the bottom edge 124 of the insulating glass unit 118. In order to spread out the weight of the insulating glass unit 118 over a larger area, the roller cart 110 typically includes two or more ball bearing supports. 125. To ensure there is not a thermal bridge at the perimeter edge 122 of the insulating glass unit 118, the cart 110 is made from a low conductive thermoplastic material and is typically manufactured using an injection molding process.

Figure 7A:
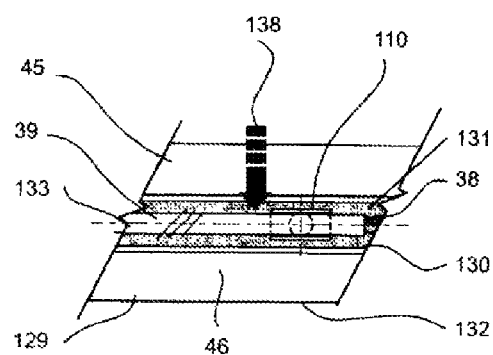
FIGS. 7a, 7b, 7c, 7d show alternative vertical plan and bottom edge cross section details of a compression sealing and push-over operation for a horizontal sliding VIG unit as shown in FIG. 1.
Figure 7C:
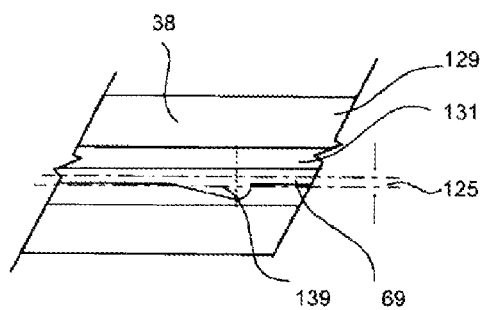
Figure 7B:
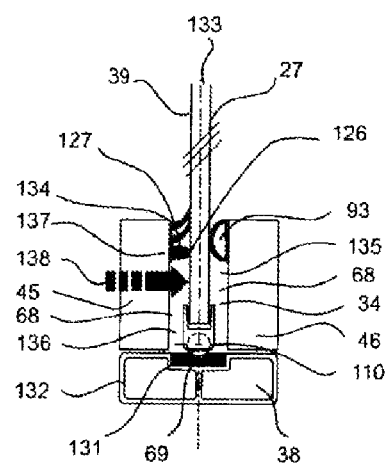
Figure 7D:
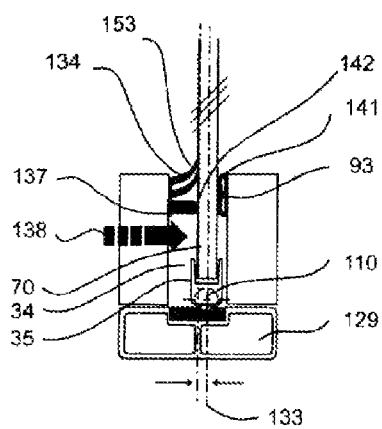

FIGS. 7a, 7b, 7d show alternative vertical plan and bottom edge cross section details of the push-over operation for a horizontal sliding VIG unit 39 as shown in FIG. 1. As previously mentioned, compressible rubber seals 85 laminated with flock tapes 106 are conventionally used for a sliding automotive side windows seals. However our experience has shown that these flock tape compressible rubber seals do not work as effectively in providing sliding seals for horizontal sliding glass assemblies 25 as described in FIG. 1. There are a number of reasons why automotive sliding seal technology is not appropriate for building applications, including: larger window sizes, less rigid glass and frame assemblies, lower manufacturing tolerances and longer required product life. As shown in FIGS. 7a, 7b, 7c, 7d, an alternative approach has been developed where the VIG unit 39 moves over perpendicularly by about an ⅛ inch to fully compress the compressible rubber seals 93 located adjacent to the inner top edges 102 of the fixed or removable insulating inserts 45,46.

FIG. 7a shows a top plan view of the top or bottom profiles 128, 129 of the outer frame 38. The bottom or top profiles 128, 129 include a flat channel 130 that holds in place a plastic insert 131. The insert 131 incorporates a single groove 69 that allows the ball bearing roller cart 110 to move back and forth parallel to the side face 132 of the outer frame 38. The VIG unit 39 is bottom and top supported at quarter points by spring mounted hardware attached to roller carts 110.

FIG. 7b shows a vertical bottom edge cross section on a line 7a-7a of the VIG unit 39 located on the center line 133 of the edge pocket 34 supported by a roller cart 110. The gaps 68 between the VIG unit 39 and the insulating inserts 45, 46 are sealed, using three different types of compressible seals. The gap 135 between the VIG unit 39 and the removable insulating insert 46 is sealed using a D-shaped compressive seal 93. The gap 136 between the VIG unit 39 and the fixed insert 45 is sealed using a double flexible V-shaped fin seal 134. In addition, a nib seal 137 provides constant perpendicular pressure on the VIG unit 39. The nib seal 137 can be made using a harder durometer rubber but as shown by arrow 138, in order to ensure that a constant perpendicular pressure is applied over an extended period of time, the nib seal 137 can also incorporate a series of small metal spiral springs (not shown) or other devices that provide for long term spring-back performance. The nib seal 137 also incorporates a front edge contact surface 127 that provides for minimum friction between the VIG unit 39 and the nib seal 137 with one option being a flock tape surface finish 126.

FIG. 7c shows a plan detail view of the top or bottom profiles 128, 129 of the outer frame 38. The plastic insert track 131 incorporates a wedge-shaped switch indent 139 located on the outer edge of the groove. The switch indent 139 functions somewhat similar to a railway switch point where the switch point can divert a train from the main track to a siding. As the VIG unit 39 travels down the groove 69, the ball bearing roller cart is pushed over by the pressure of the spring reinforced nib 137. As a result, the VIG unit 39 moves perpendicular by about ⅛ of an inch 125 and the D-shaped seal 93 is fully compressed.

Typically, the insert 131 is made from rigid thermoplastic material with nylon being a suitable material because of its wear resistance, load bearing capabilities and low coefficient of friction. The wedge shaped indents 139 can be CNC machined or alternatively, insert strip pieces (not shown) incorporating the wedge-shaped indent 139 can be injection molded and connected together with straight insert strip extrusions (not shown).

FIG. 7d shows a vertical cross section of the top or bottom profiles 128,129 with a VIG unit 39 supported by a roller cart 110 and located about ⅛" over from the center line 133 of the top or bottom edge pockets 32, 34. As a result of the perpendicular pressure applied 138, the D-shaped compressive seal 93 is fully compressed providing a high performance air barrier seal or water shedding seal 141. The flexible V-shaped seal 134 extends upwards to provide an air flow seal 153 that helps prevent air flow around the bottom perimeter edge 35 of the VIG unit 39. Finally the nib seal 137 extends outwards continuing to put pressure on the bottom edge-of-glass portion 70 and providing a second high performance barrier seal 142.

Figure 8:
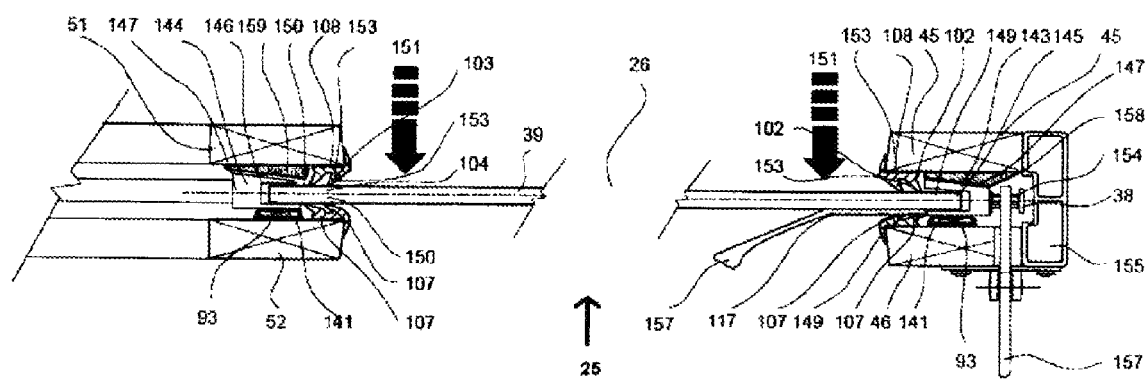
FIG. 8 shows a horizontal cross section of the horizontal sliding VIG unit as shown in FIG. 1 with a complementary compression sealing and push-over operation to the top and bottom compression and sealing device as described in FIG. 7.

FIG. 8 shows a horizontal cross-section of the VIG unit 39 and the pocket frame opening 26. Both a frame stile U-shaped plastic profile 143 and a cavity stile plastic profile 144 are structurally adhered to the vertical perimeter edges 145, 146 of the VIG unit 39. Both the frame stile 143 and the cavity stile 144 incorporate a wedge-shaped profile 147 on the outer side 148 of the fenestration assembly 25. Complementary hard rubber wedge-shaped seals 158, 159 are attached to the fixed insulating insert 45 and the fixed mullion insert 51.

Simultaneously, with the bottom and top horizontal edges (not shown) of the VIG unit 39 being moved over perpendicularly by about ⅛", the VIG vertical edges 149, 150 are also both simultaneously moved over perpendicularly by about ⅛" shown by arrows 151. Both the compressible D-shaped rubber seals 93 attached to the removable insulating insert 46 and the removable mullion insert 52 are fully compressed providing high performance barrier seals 141. The inner V-shaped flexible seals 107 are compressed down while the outer V-shaped seals 108 expand outwards to maintain soft air-flow seals 153 between the inner top edges 102, 104 of the outer fixed insulating insert 45, the outer fixed insulating mullion insert 51 and the VIG unit 39.

A tubular metal extension piece 154 with a flat metal circular head 155 is attached to the back edge 156 of the frame stile profile 143 and a complementary latch 157 is attached to the removable insulating insert 46 and the outer frame 38. To lock the fenestration assembly 25, the latch 157 engages the metal extension piece 154. The latch may be a rotary cam lock that can be operated automatically by a separate small motor (not shown). Because the seal compression function is separate from the window-locking function, the process is generally easier to automate.

Typically, the VIG unit 39 moves to a closed position and the operation of the cam locks is then automatically initiated with the VIG unit 39 locked in position. When opening the locks, this process is obviously reversed. A further component of the hardware system is the pull handle 157 that is typically directly attached to glass surface four 117 of the VIG unit 39. For the design of the handle design 157, there is generally a need to trade off the key design requirement for a comfortable ergonomic user interface against a second key requirement which is to hide the VIG unit 39 in the cavity pocket 29 when the VIG unit 39 is in an open position.

FIG. 9 shows a series of vertical cross sections of the fenestration assembly 25 as shown in FIG. 1 overlapping an existing traditional double hung window 161 and installed on the interior side 56 of an existing masonry wall 162. A top supported Venetian blind 164 may be installed between the fenestration assembly 25 and the traditional double hung window 160. The three fenestration components 39, 160 and 164 are positioned in different seasonal modes of operation.

As shown in FIG. 9a, during the winter heating season, the double hung window 160 is fully closed and the slats of the Venetian blinds 164 are open at the appropriate angle to allow sunlight 169 to pass through during the day. Depending on the availability of solar thermal energy and the exterior outdoor temperatures, the VIG unit 39 is also typically fully closed.

The fenestration assembly 25 is installed over the existing window 160 and is typically supported in part either by a wood stud wall (nor shown) fabricated from 2"×2" wood studs or alternatively, directly attached to the existing wall 162 using mounting brackets (not shown). Additional wall insulation 163 is also retrofitted to the existing wall 162 and the width of this additional insulation 163 typically matches the width 161 of the fenestration assembly 25.

Various alternative wall insulating materials can be added, including: sprayed polyurethane foam, rigid foam sheets, aerogel, rock wall, fiberglass etc. As shown in vertical cross section detail FIG. 9e one option is to use VIP panels 65 as the additional insulation because of their high insulating performance, As previously described, the minimum width 161 of the fenestration assembly 25 incorporating a VIG unit 39 is about 2 inches or 2.25" with pre applied plaster board 87 covering the cavity pocket 29.

Figures 9C, 9D:
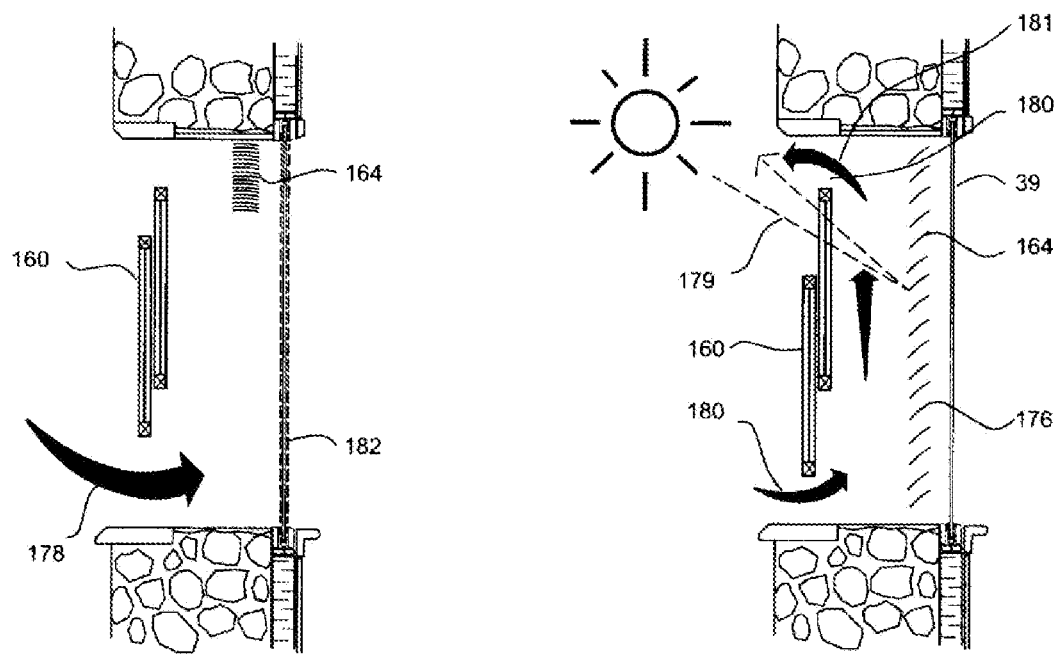
Figure 9E:
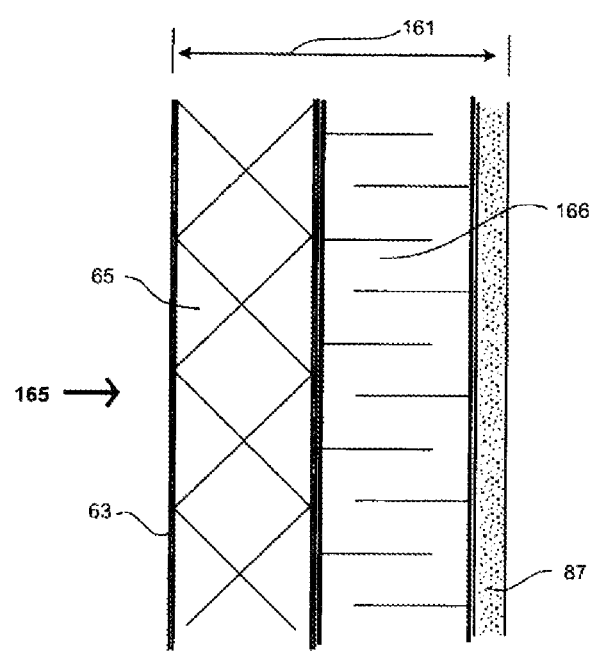

As shown in FIG. 9e in order to match this minimum width 161, the VIP wall assembly 165 typically consists of a 1 inch VIP panel 65 with protective metal sheeting 63, 1 inch wide protective foam material 166 and 0.25" wide pre applied plaster board 87 and in combination, this VIP wall assembly 165 has an insulating performance in excess of R-40.

For masonry walls because of the need for inward drying, the retrofit of VIP panel assemblies 165 can cause interstitial condensation and other related problems and special installation details are required. However when adding additional insulation to an existing wood stud wall or to a brick cavity wall, there is not the same critical need for inward drying and interior VIP panel retrofits are a more practical solution.

When retrofitting the fenestration assembly 25 to a heritage building, the traditional wood trim 167 is first removed. The fenestration assembly and the additional wall insulation 163 is then retrofitted and plaster board 87 is then installed over both the additional insulation 163 and the pocket frame 31 portion of the fenestration assembly. The traditional wood trim 167 is then replaced and for the casual observer, it would be difficult to notice that the building's interior appearance had been modified. Because the perimeter edges 35 of the VIG unit 39 are buried within the insulating wall assembly 165, only transparent glass 168 is visible and so the retrofit of the fenestration assembly 25 is quite visually unobtrusive. However, the combined retrofit of the VIG fenestration assembly 39 and additional insulation 163 radically improves the insulating performance of the existing wall 162.

Figure 9F:
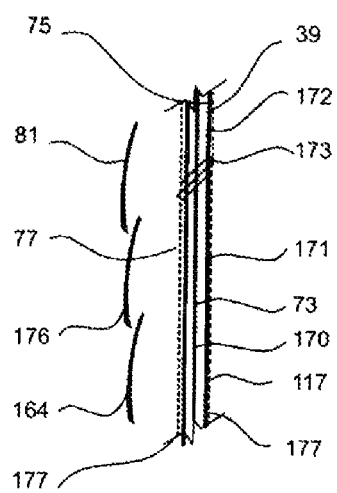

As shown in vertical cross section detail FIG. 9f, the VIG unit 39 incorporates an ultra-low emissivity coating 75 positioned on glass surface five 170. Typically, this coating functions as a solar control low-e coating 171. Because the solar control coating 171 limits the transfer of near infra-red solar radiation, the inner glass sheet 172 heats up and as there is limited heat transfer back across the vacuum cavity 73, a surprisingly high percentage of potential solar heat gains are re-radiated from glass surface six 173 and enter the room interior to be usefully employed for space heating.

As shown in cross section detail FIG. 9b, during the winter night, the Venetian blinds 164 are typically closed creating two additional air spaces 174,175. As further shown in FIG. 9f, the slats 176 of the Venetian blinds 164 feature a low-emissivity coating surface finish 81 or alternatively exterior coatings 177 can be installed on glass surfaces two 76 (not shown) and glass surface three 77. With additional exterior low-e coating 177 on surface six 173, the combined center-of-glass insulating performance for the three components 160, 164, 39 can be about R-22.

As shown in FIG. 9c, during the spring/fall swing seasons as well as during summer nights, the existing double hung window 160 is fully open: the Venetian blinds 164 are refracted, and the VIG unit 39 is in a fully open position within the cavity pocket 29 (See dotted sectional line 182). As shown by arrow 178, maximum advantage is taken of natural ventilation and cooling.

As shown in FIG. 9d, during the summer cooling season, the existing double hung window 160 is opened top and bottom; the Venetian blind 164 and the VIG unit 39 are both in a closed position. With the solar control low-e coating 171 on glass surface five 170, there is the potential for high solar gains to be transferred to the interior. However because the Venetian blind 164 is located on the exterior side of the VIG unit 39 and with the slats 176 tilted at an appropriate angle most of the direct solar radiation is intercepted and as shown by arrows 179, the rejected solar gains 180 are removed by natural convection through the top opening 181 of the double hung window 160.

The above has described a fenestration assembly comprising a frame that has an opening and a pocket section. The pocket section is covered with an insulating panel. A sliding glass assembly can be received within the opening and can slide into the pocket section. The above described fenestration assembly is well suited for use in retrofitting existing buildings to improve insulating window-and-wall performance. For example, the fenestration assembly can be installed on the inside or outside of a building to cover an existing window. The fenestration assembly having a single sliding glass assembly may also be used in new construction. Further as described below, it is possible to provide two sliding glass assemblies in the frame of the sliding glass assembly. A fenestration assembly having two assemblies can be used on new or retrofit construction and provides for substantially improved window-and-wall insulating performance.

Figure 10:
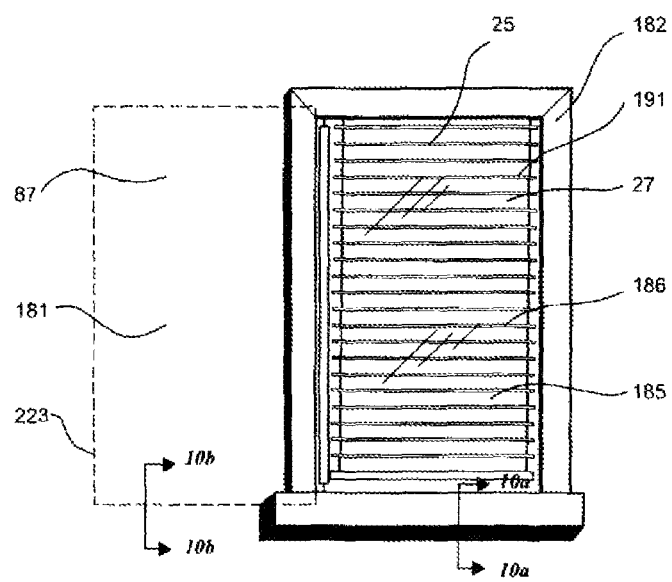
FIG. 10 shows an elevation view of a fenestration assembly that incorporates a pocket window frame and two horizontal sliding, double glazed sash windows that move back and forth into two cavities that form part of the pocket window frame and where the fenestration assembly also incorporates a Venetian blind located between the sliding VIG units.

FIG. 10 shows an interior elevation view of a fenestration assembly 25 installed within a wood stud wall 187 (not shown) covered by plaster board 87. Insulating trim 182 is installed over the removable insulating inserts 46 (not shown) and outer frame 38 (not shown). The fenestration assembly 25 incorporates a pocket frame 31 (not shown) and two horizontal sliding, glass assemblies 27 that move back and forth into two cavity pockets 29,183 (not shown) that form part of the pocket frame 31. Different types of horizontally sliding glass assemblies 27 can be installed within the fenestration assembly 25 and as shown in FIG. 10, the glass assemblies 27 are conventional sash windows 185 incorporating conventional double glazed insulating glass units 186.

Specifically as shown in FIG. 10, the outer sash 191 is in a fully closed position and the inner sash 190 is in a fully open position as shown by dotted line 223. By overlapping the pocket frame 31 (not shown), only transparent glass 168 is visible. By installing the window trim 182 on site, it is feasible to customize the appearance of the fenestration assembly 25 both on the building exterior (not shown) and on the building interior 181.

Figure 11:
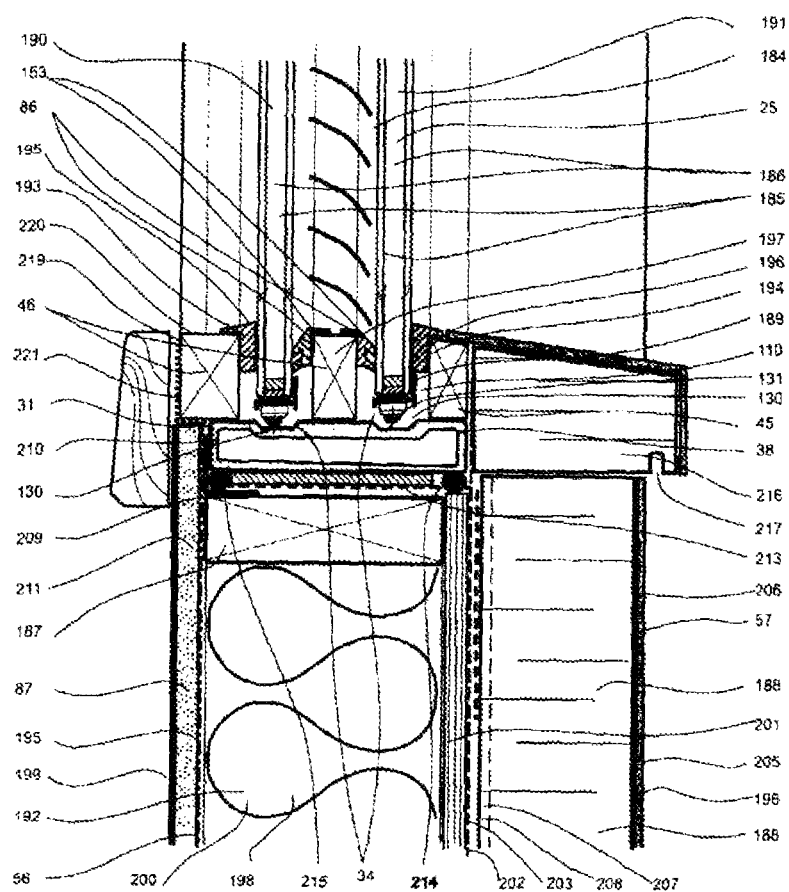
FIG. 11 shows a vertical cross section detail on a line 10a-10a of the fenestration assembly as shown in FIG. 10 installed within a 2" by 6" wood stud wall and with overlapping rigid insulation.

FIG. 11 shows a vertical cross section detail of the bottom edge of the fenestration assembly 25 on a line 10a-10a as shown in FIG. 10 installed within a 2"×6" wood stud wall 187 with overlapping rigid insulation 188. The insulating glass units 186 are supported in L-shaped sash frames 189 that can be made from a variety of different insulating materials. As shown FIG. 11, the sash frame 189 is made from a pultruded fiberglass profiles and the sash frame may be supported by a ball bearing roller cart 110. The outer frame 38 is also fabricated from pultruded fiberglass profiles and features two flat channels 130 that incorporate an insert 131 (not shown).

Through the use of a compression sealing and push over mechanism, the sash windows 185 can be moved over perpendicularly by about a ⅛". For a double, double glazing assembly 184, when the sash windows 185 are closed, the inner sash 190 moves perpendicular and ⅛" closer to the interior side 56 of the insulating wall 192 and the outer sash 191 moves about an ⅛" closer to the exterior side 57 of the insulating wall 192. The inner and outer compressible foam rubber seals 193, 194 are fully compressed and as a result an effective air barrier seal 195 is formed on the interior side 56 and an effective water shedding seal 196 is formed on the exterior side 57.

Two flexible V-shaped compressible seals 86 are attached to the center insert 197 and as the sash windows 185 move perpendicularly away from the center insert 197, the flexible seals 86 expand outwards to provide for an effective convective air flow barrier 153 on either side of the center insert 197.

In describing the insulating wall assembly 198 from inside to outside, the assembly 198 for the 2" by 6" stud wall 187 is comprised of the following materials: 0.5" wide plaster board 87; a vapor/air barrier 195 typically a polyethylene sheet 199; 5.5 inches of fiberglass batt insulation 200; 0.5" wood sheathing 201; a water resistance barrier 202 typically bitumen coated building paper 203; rigid foam insulation 188 typically 2 to 6 inches in width, and an exterior surface finish 205 that functions as the water shedding barrier 196. Various exterior surface finishes 205 can be used, including siding and as shown in FIG. 11, an Exterior Finishing Insulating System (EIFS) stucco finish 206 is directly applied to the rigid foam insulation 188.

Because the pocket frame 31 is buried within the insulating wall assembly 198, conventional rain screen detailing is employed to prevent any water that bypasses the rain shedding barrier 196 from causing possible water damage to the wood stud wall assembly 187. The back face 207 of the rigid foam insulation 188 incorporates vertical grooves 208 that allow water to be drained away to the exterior. In addition, the water resistance barrier 202 also typically overlaps the bottom wall flashing (not shown).

In installing the fenestration assembly 25 within an insulating wall assembly 198, various other rain screen details are used to prevent water from entering the wood stud wall assembly 187, including: wood sill membrane flashings 209, corner membrane flashings (not shown) and jamb membrane flashings (not shown). In addition, a metal angle 210 is also typically installed in line with the inner face 211 of the wood stud wall 187. The sill membrane 209 is wrapped over the metal angle 210 to provide a 2" high protective barrier that can withstand during extreme driving rain conditions. To further enhance water drainage, a sloped wood sub sill (not shown) can be installed with the sill membrane 209 applied on top of the sub-sill.

The pocket frame 31 is conventionally installed using shims 213 and the interior and exterior joints 214, 215 between the wall assembly 198 and the pocket frame 31 are carefully sealed using sealant. To further ensure that water sheds away from the fenestration assembly 25, a separate overlapping foam sloped sill 216 incorporating a lower drip channel 217 is installed on top of the rigid foam wall insulation 188. The outer insulating insert 45 is fixed in position while the two removable inserts 46 allow for the replacement of the insulating glass (IG) units 186 in case of glass breakage or IG edge seal failure. A rubber tape membrane 219 overlaps the sill membrane 209 applied to the metal angle 210 and is sealed to the outer face 220 of the inner removable insert 221. The bottom edge pockets 34 are drained to the exterior using plastic tubing (not shown) with the tubing located within a groove (not shown) incorporated into the back face 207 of the insulating foam sheet 188. At the bottom wall flashing (not shown), the tubing drains to the exterior.

By overlapping the pocket frame 31 on all four sides with rigid foam insulation 188, heat loss through the outer frame 38, the edge pockets and the mullion pocket is substantially reduced. Even though the foam insulation 188 overlaps the pocket frame 31, it is feasible through careful rain screen detailing to prevent any wind driven water from causing any damage to the insulating wall assembly 198.

Figure 12:
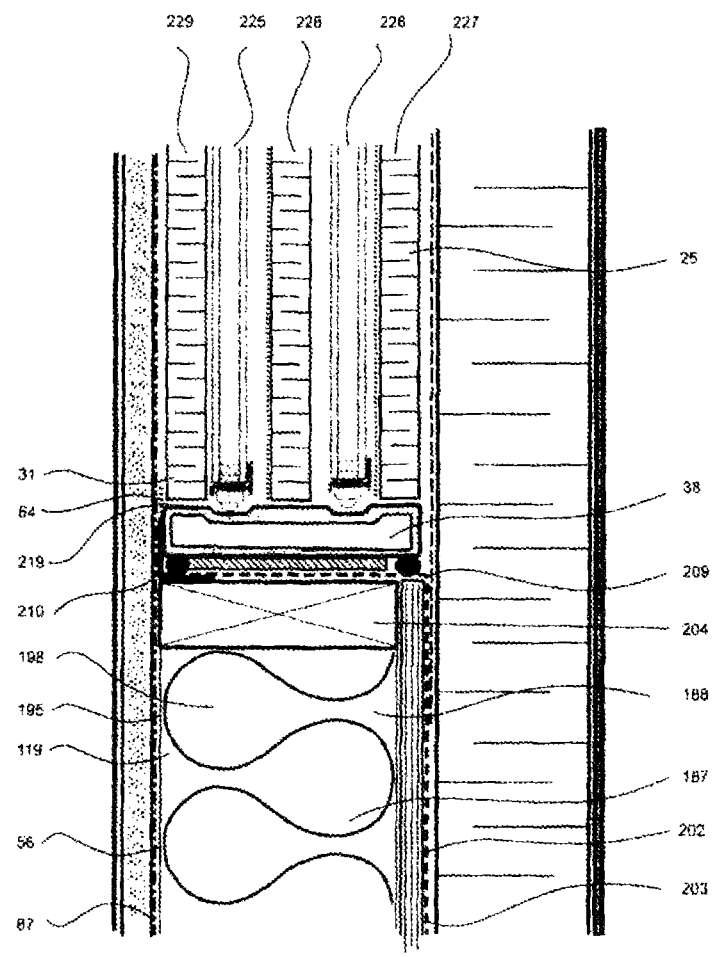
FIG. 12 shows a vertical cross section on a line 10b-10b of the fenestration assembly as shown in FIG. 10 installed within a 2" by 6" wood stud wall and with overlapping rigid insulation.

FIG. 12 shows a vertical cross section a line 10b-10b of the fenestration assembly 25 as shown in FIG. 10 installed within 2" by 6" wood stud wall 187 with overlapping rigid insulation 188. The fenestration assembly 25 features an outer frame 31 and two outer and inner pocket cavities 225,226 that are defined by three insulating stressed skin panels 227,228, 229. An air/vapor barrier 195 typically a polyethylene sheet 119 overlaps the wood stud wall 197 and the fenestration assembly 25. Plaster board 87 is installed on the interior surface 56 of the insulating wall assembly 198 and the pocket frame 31 with the option of preapplying the plaster board 87 to the inner stressed skin panel 229.

The outer stressed skin panel 227 is fixed in position and the joints 64 between the outer panel 227 and the outer frame 38 are sealed with a rubber membrane tape 219. A water resistant barrier 202 such as bitumen coated building paper 203 is applied to the exterior side of both the insulating wall assembly 198 and the pocket frame 31. The wood stud wall 187 is further protected by a rubber membrane 209 applied to the wood sill plate 204 and the metal angle 210 with the joints 64 between the inner stressed skin panel 229 and the outer frame 31 also sealed with a rubber membrane tape 219 that also overlaps the membrane 209 applied to the L-shaped metal angle 210.

Instead of using L-shaped sash frames 189 and conventional double glazed units 186, VIG units 39 can be substituted. Because of the thin width of the VIG units 39, the width of the pocket frame 31 can be reduced to 4" and this has the advantage that a double, double VIG fenestration assembly 230 can be installed within conventional 2" by 4" wood stud walls (not shown). To achieve a minimum 4" pocket frame width, the width of the pocket cavities 225,226 can be reduced to 0.75", the inner and outer stressed skin foam panels 227,229 can be reduced to 1" in width, and the center panel 228 can also be reduced to 0.5" in width with the center panel 228 also typically incorporating a VIP assembly 65.

In North America, the majority of existing wood-framed residential building are fabricated using 2" by 4" wood stud construction and even though existing wood stud walls typically incorporate three and a half inches of fiberglass insulation (R-12 approx), the combined overall insulating performance of the window-and-wall assembly may be as little as R-7 because of thermal bridges in the insulating wall construction and the poor performance of the existing windows.

To radically upgrade the energy efficiency of these existing residential buildings, the existing windows can be removed and the openings enlarged allowing for the retrofit of double, double VIG horizontal sliding windows 230. As much as six inches of additional rigid foam insulation can be retrofitted on the outside of the building r with a new exterior surface finish then being applied. Compared to the R-7 overall thermal performance of an existing window/wall assembly, the thermal performance of the upgraded window-and-wall assembly can be as high as R-35 overall.

FIGS. 13a, 13b, 13c and 13d show a series of diagrammatic vertical cross sections of the double, double sash window fenestration assembly 184 shown in FIGS. 10, 11 and 12. The fenestration assembly 25 comprises a pocket frame 31, two horizontally sliding sash windows 232, 233 incorporating conventional insulating glass units 186 that can be received in two insulating cavity pockets 29 (not shown), and a top supported Venetian blind 164 deployed between the two sash windows 232, 233.

FIG. 13a shows the fenestration assembly 184 during winter daytime operation when solar thermal energy is usefully available for heating. To allow for high solar gains, the outer sash window 232 is in a fully closed position and the inner sash window 233 is in a fully open position. The outer sash window 232 incorporates a conventional insulating glass unit 186 with a solar gain low-e coating 234 located on glass surface three 77 as numbered from the exterior. The slats 176 of the Venetian blind 164 are angled to allow in solar heat gains as shown by arrow 236.

FIG. 13b shows the fenestration assembly 184 during winter night time operation. To provide for maximum insulating performance both the inner and outer sash windows 232, 233 are in a fully closed position. The Venetian blind 164 is also deployed with the slats 176 being closed position and this effectively creates two additional glazing cavities 174,175. Additional low-e coatings 81 are located on either both surfaces of the Venetian blind slats 176 or incorporated as exterior low-coatings 177 on glass surfaces four 117 or five 170. With an additional exterior low-e coating 177 on glass surface eight 235, the combined center-of-glass insulating performance of the fenestration assembly 184 is about R-15.

FIG. 13c shows the fenestration assembly 184 during summer night time operation when natural cooling is available and also during swing season operation when natural ventilation is required. To maximize natural ventilation and cooling, the Venetian blind 164 is in a raised position and both the outer and inner sash windows 232,233 (not shown) are in an open and parked position. The air flow of natural ventilation is shown by arrow 238.

FIG. 13d shows the fenestration assembly 184 during summer day time operation when air conditioning is required because of high outside air temperatures and humidity levels. To minimize solar gains, the outer sash 232 is in a fully open position and the inner sash 233 is in a fully closed position. A solar control low-e coating 171 is located on glass surface six 173 of the fenestration assembly 184. The Venetian blind 164 is deployed with the slats 176 angled to directly intercept most of the incoming direct solar radiation as shown by arrow 237 with a solar control low-e coating 171 located on glass surface six 173, further preventing the transfer of near infra-red solar radiation to the building interior 181.

Although window sashes incorporating conventional insulating glazing units are shown in FIG. 13, horizontally sliding double, double VIG assembly 230 can be substituted. For winter night performance, the combined center-of-glass insulating performance can be in excess of R-35 which is substantially higher than existing commercially available products.

Figure 14:
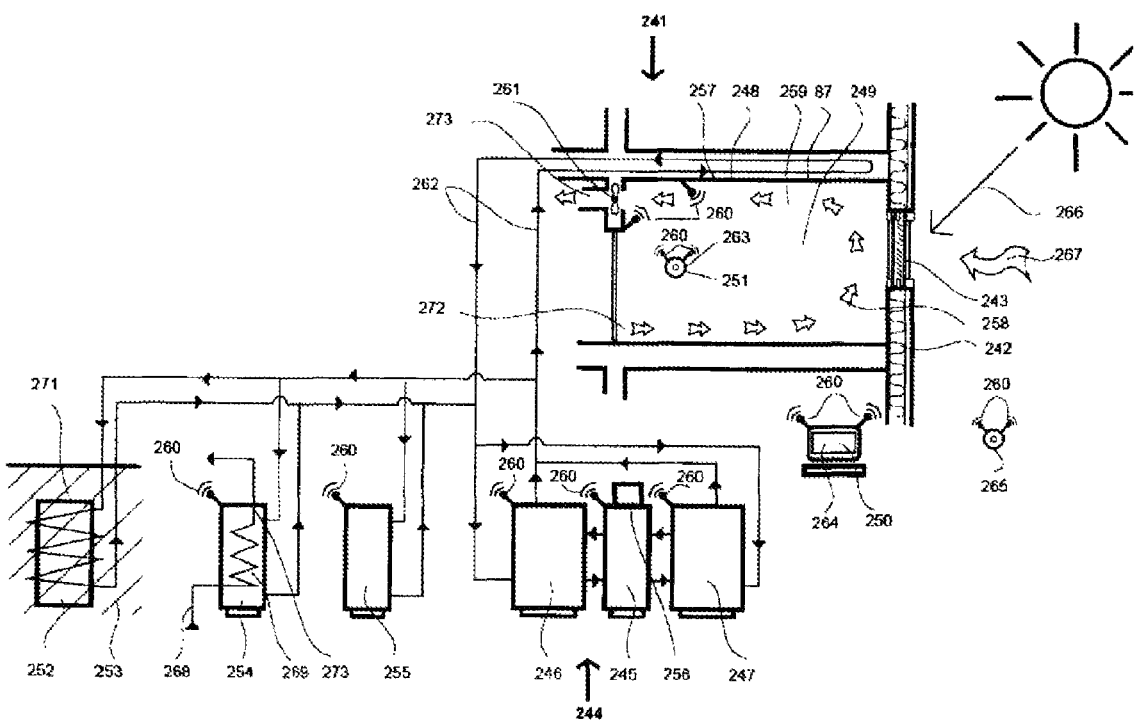
FIG. 14 shows a shows a schematic diagram of a building energy system featuring a dynamic, high-R fenestration assembly as described in FIG. 10.

FIG. 14 is a schematic cross section diagram of a building energy system 241 that is comprised of the following major components or subsystems: a high-R insulating and airtight building envelope 242; a set of dynamic, high-R fenestration assemblies 243; an integrated mechanical system 244 including a heat pump 245 and cold and hot storage tanks 246,247; a series of radiant heating and cooling panels 248; an air stratified ventilation system 249 and a control system 250 including sensors 251. Other optional system components include: a drain water heat recovery system 252 integrated with ground storage 253; a supply water preheat tank 254, and a liquid desiccant dehumidifier and ventilation air heat exchanger 255.

Specifically, FIG. 14 shows a cross section of a perimeter room 259 featuring a high-R building envelope 242 and dynamic, high-R fenestration assemblies 243, typically with R-35 minimum performance. The dynamic, high-R fenestration assembly 243 is comprised of a pocket frame 31, horizontal sliding double, double VIG units 230 and with a Venetian blind 164 located between the VIG units 39.

As previously described in FIG. 13, the VIG units 39 and the Venetian blind 164 can be deployed in various ways to optimize heating and cooling performance. Although a double, double VIG assembly 230 is shown in FIG. 14, alternative dynamic, high-R window technologies can be substituted and these technologies also feature moveable insulation, variable solar control and natural ventilation.

The integrated mechanical system 244 includes a cold thermal storage tank 246, a hot thermal storage tank 247 and a heat pump 245 that can function in either in a single or dual mode of operation. In the single mode of operation, the heat pump 245 upgrades low grade thermal heat or cold from various sources such as passive solar heat, supply water preheat and drain water heat recovery.

In the dual mode of operation, the heat pump 245 transfers heat from the cold water storage tank 246 to the hot water tank 247. As the heat pump 245 simultaneously supplies both hot and cold water and assuming that both the hot and cold water can be usefully utilized, this dual mode of operation is intrinsically more energy efficient than if only hot or cold water is solely produced and utilized. Although not shown in FIG. 14, one option is for the hot and cold tanks 246,247 to be combined into a single stratified tank (not shown) and for the single tank to be manufactured from an insulating material such as fiberglass.

The integrated mechanical system 244 also incorporates a liquid handling system 256 that includes a control system, a series of three way valves, pump and related components. The liquid handling unit 256 allows the integrated mechanical system 244 to efficiently change over from dual mode to single mode operation.

With a high-R building envelope 241 and dynamic, high-R energy efficient windows 243, the space heating and cooling loads of a building are so small that it is preferable because of air quality concerns, that heating and cooling inputs are supplied separately from ventilation air. As shown in FIG. 14, one solution for separating heating and cooling inputs from ventilation air is to use hydronic radiant panels 248 that are integrated into the room ceiling 257 and are typically covered by a comparatively high thermal mass building material such as plaster board 87.

Hydronic radiant panels 248 offer the key advantage that both radiant heating and cooling can be delivered through the same hydronic distribution system 262. Also the radiant panels 248 connected to a hydronic distribution system 262 allow comfort conditions to be controlled room by room. Typically during the winter heating season, the radiant hydronic ceiling panels 248 are connected to the hot water tank 247 and during the summer cooling season, the radiant hydronic ceiling panels 248 are connected to the cold thermal storage tank 246.

By eliminating window down drafting, dynamic, high-R fenestration assemblies 243 provide the opportunity to use air stratified ventilation 249. With air stratified ventilation 249, ventilation supply air as shown by arrows 258 enters the perimeter room 259 through lower vents 272. The air enters at a low velocity and a temperature only slightly lower than the desired room temperature. The cooler supply air displaces the warmer room air creating a zone of fresh air at the occupied level. Heat and contaminants produced by the room occupants and their activities rise to the ceiling 257. The polluted air 261 is then fully exhausted from the perimeter room 259 through upper vents 273.

Air stratified ventilation 249 only uses buoyancy to supply ventilation air and typically, good air quality can be maintained without the need for mechanical exhaust fans. However as shown in FIG. 14, there is the option of using a small duct fan 261 to speed up the removal of polluted or high humidity air from the perimeter room 259.

One key advantage of a stratified air ventilation system 249 is that in hot, humid climates, an air stratified system 249 is more efficient in drying out a building than a centralized ducting system. As a result, dry comfort conditions can be more quickly achieved and this allows for more aggressive intermittent use of natural ventilation (i.e. open windows).

To provide dry air to the perimeter room 259, a solution is to use a liquid desiccant dehumidifier 255 that typically uses waste heat from the building to regenerate the liquid desiccant material. In the winter, the liquid desiccant dehumidifier and energy exchanger 255 recovers both latent and sensible heat from the ventilation exhaust air and preheats the incoming supply air. In the summer, the liquid desiccant dehumidifier and energy exchanger 255 dehumidifies and cools the incoming ventilation air.

In hot and humid climates, a key advantage of the liquid desiccant dehumidifier 255 is that the sensible cooling load and the dehumidification load are balanced and this allows for efficient dual mode operation of the heat pump 245. In hot, dry climates, the sensible cooling load dominates but by spraying water droplets, the incoming air can be cooled through evaporation and then by dehumidifying the incoming air, it is again feasible to balance heating and cooling loads that allows for efficient dual mode operation of the heat pump 245.

To optimize the performance of the building energy system 241, there is a need for a control system 250 and as shown in FIG. 14, one approach is to incorporate an individual controller 263 in each perimeter room 259 with these individual controllers 263 then linked to a central controller 264. The individual room controllers 263 can control the operation of the hydronic radiant heating and cooling panels 248, the small room exhaust fan 261 and the dynamic components of the fenestration assembly 243.

Each perimeter room 256 also incorporates sensors 251 that monitor a range of different properties, including: room temperature, humidity, occupancy and light levels. Additional sensors 265 located outside of the building enclosure monitor other properties, including: outside temperature and availability of solar radiation. These various sensors 251, 265 are typically linked either to the room controller 263 or directly to the central controller 264 using wireless connections 260.

Major appliances such as a refrigerator or a clothes dryer as well as other major HVAC components of the building energy system 241 can also be linked to the central controller 264 by wireless connections 260. As well, the central controller 264 can be linked to the Internet and the local electrical utility company. Based on weather predictions, sensor measurements and an understanding of the occupant's future activities, the central controller 264 can determine how much heat or cold thermal energy needs to be stored.

Specifically for the dynamic high-R fenestration system 243, the controllers 263, 264 can determine room by room three key functions: 1. whether one or both VIG units 39 should be closed to reduce heat loss; 2. whether the fenestration assembly 242 should be configured to collect or reject solar heat gains 266, and 3. whether the VIG units should be opened to provide for natural ventilation and night time cooling 267.

Particularly with unoccupied rooms, more aggressive passive solar heating and natural ventilation/night cooling strategies can be adopted. For example during or prior to a sunny winter's day, the thermal mass in the ceiling 257 can be cooled down by the radiant hydronic panels 248 resulting in the low grade heat from the ceiling's thermal mass being transferred to the cold thermal storage tank 246. This low grade heat can then be upgraded by the heat pump 245 before being stored in the hot thermal storage tank 247. As a result of lower thermal mass temperatures, solar heat gains can be more efficiently collected and stored in the thermal mass, resulting in an increased utilization of available solar thermal energy 266.

With the use of a liquid desiccant dehumidifier 255 and prior to hot summer's day, the thermal mass in the ceiling 257 can also be cooled down by the radiant hydronic panels 248 resulting in the low grade heat from the ceiling's thermal mass being transferred to the cold thermal storage tank 246. As with the winter day operation, this low grade heat can then be upgraded by the heat pump 245 before being stored in the hot water storage tank 247. As a result of lower thermal mass temperatures, there is a reduced need for daytime cooling with waste heat being absorbed into the thermal mass.

With natural ventilation and night time cooling and even when the outside night air is comparatively warm, low grade heat can also be collected, stored and later usefully employed for liquid desiccant regeneration. The night time low grade heat gains can be collected, stored and upgrade for high temperature regeneration of the liquid desiccant during the day when the windows are closed.

With a high-R building envelope 242 and dynamic high-R windows 243, domestic hot water (DHW) heating loads can be larger than space heating loads. Existing drain water heat recovery devices recover heat from the waste water from showers or clothes washing and then using a spiral heat exchanger, the devices transfer this waste heat to preheat the incoming cold water supply from a ground well or water mains. Because these existing heat recovery devices can only operate efficiently when water supply and waste water production are in tandem, these existing heat recovery devices are typically only about 25% efficient.

An alternative heat recovery strategy is for the cold water supply 268 from a ground well or water mains to pass through a heat exchanger 269 located in a preheat water tank 254 that is connected to the radiant ceiling panels 248. As previously described during sunny winter days, the thermal mass in the ceiling 257 can be cooled down by the radiant hydronic panels 248 resulting in the low grade heat from the ceiling being transferred to the supply water preheat tank 254. As the cold water supply 268 passes through the preheat tank 254, it is heated up to room temperatures using only passive solar heat gains delivered via the fenestration assembly 243.

Complementing the preheat tank 254 is a drain water heat recovery device that simply consists of piping wrapped around or below a buried and insulated septic tank 271. Because the tank 271 is in thermal contact with the ground much of the drain water waste heat is recovered and temporarily stored in the ground 253. When required, this stored drain water waste heat can be removed and upgraded by the heat pump 245. It is estimated that this combined system of solar preheat and heat pump upgrade of stored drain water waste heat can provide for an overall equivalent DHW heat recovery efficiency of 75 percent.

To simplify the on-site installation of the heating, ventilation and air conditioning (HVAC) system, component parts of the integrated mechanical system 244 including the heat pump 245 and liquid handling unit 256; component parts of the control system 250 and component parts of the liquid desiccant dehumidifier 255 can be packaged in a single box with input and output connections to other major components of the HVAC system, including; radiant heating and cooling panels 248; hot and cold storage tanks 247,248; supply water pre heat tank 254 and drain water heat recovery 252 including ground storage 253.

In general as a result of combining a high-R building envelope 242 and dynamic high-R windows 243 with an integrated mechanical system 244, a building enclosure can be cost effectively heated and cooled using only electrical power. By using a small efficient heat pump 245 for space heating, space cooling and domestic hot water heating, the integrated mechanical system 244 provides for a more even seasonal demand for electrical power. Moreover because the integrated mechanical system 244 incorporates both a cold water tank 246 and a hot thermal storage 247 as well as ground linked storage 253, the building energy system 241 can be operated so that daily peak load demands are substantially reduced and full advantage can be taken of off-peak power rates.

Numerous modifications, variations and adaptations may be made to the particular embodiments of the invention described above without departing from the scope of the invention which is defined in the claims.

What is claimed is:

1. An energy efficient fenestration assembly for enclosing an opening in a building wall and configured to overlay a conventional window the fenestration assembly comprising:
    a frame having at least four edges surrounding first and second sides to be partially covered by building material, the frame defining:
    an opening from the first side to the second side; and
    a first pocket section next to the opening and sized at least equally to the opening,
    the frame comprising:
    an insulating mullion pocket between the opening and the first pocket section; and
    three respective insulating edge pockets within three of the at least four edges of the frame, the three of the at least four edges surrounding the opening;
    an insulating section between the first pocket section and one of the first or second sides of the frame; and
    a first sliding insulating glazing unit supported on a bottom edge by roller carts moveable within a raceway of the frame, the first sliding insulating glazing unit capable of sealing the opening and moveable between:
    a fully-closed position in which the first sliding insulating glazing unit is located substantially within the opening and seals the opening; and
    a fully-open position in which the first sliding insulating glazing unit is located substantially within the first pocket section of the frame,
    wherein the first sliding insulating glazing unit comprises two or more glass sheets that are spaced apart and sealed at perimeter edges of the two glass sheets and features one or more low emissivity coatings facing at least one glazing cavity between the glass sheets and where the center-of-glass provides more thermal resistance than the perimeter edges, and wherein in the fully-closed position, the perimeter edges of the first sliding insulating glazing unit are located within the three insulating edge pockets and the insulating mullion pocket of the frame.

2. The energy efficient fenestration assembly of claim 1, wherein the frame further comprises a second pocket section next to the opening and sized at least equally to the opening and wherein the fenestration assembly further comprises a second sliding insulating glazing unit within the frame capable of sealing the opening and moveable between:
- a fully-closed position in which the second sliding insulating glazing unit is located substantially within the opening and seals the opening; and
- a fully-open position in which the second sliding insulating glazing unit is located substantially within the second pocket section of the frame, and
- wherein perimeter edges of the second sliding insulating glazing unit are located within the three insulating edge pockets of the frame and the insulating mullion pocket of the frame.

3. The energy efficient fenestration assembly of claim 2, further comprising:
- a blind within the opening of the frame located between the first sliding insulating glazing unit and the second insulating glazing unit; and
- an actuator for controlling the position of the blind.

4. The energy efficient fenestration assembly of claim 2, wherein one of the first or second sides of the frame is an exterior side and the other of the first or second sides of the frame is an interior side, wherein each of the first and second sliding insulating glazing units have glass surfaces that are numbered sequentially starting from the exterior side and wherein glass surface three has a solar gain, low emissivity coating, and wherein glass surface six has a solar control, low emissivity coating.

5. The energy efficient fenestration assembly of claim 1, wherein the first sliding insulating glazing unit comprises a vacuum insulating glass unit.

6. The energy efficient fenestration assembly of claim 1, further comprising a second insulating section located on the other side of the first pocket section from the insulating section, wherein the insulating section comprises a stressed skin panel comprising an insulating core and at least one structural skin.

7. The energy efficient fenestration assembly of claim 1, further comprising a first compressible seal located on the frame or on the first sliding insulating glazing unit and sealing the first sliding insulating glazing unit to the frame.

8. An energy efficient fenestration assembly installation over an opening in a building wall, the fenestration assembly installation comprising:
- a conventional window installed within the opening in the building wall;
- an energy efficient fenestration assembly arranged to overlap the conventional window, the energy efficient fenestration assembly comprising:
- a frame having at least four edges surrounding first and second sides to be partially covered by building material, the frame defining:
- an opening from the first side to the second side, the opening overlapping the conventional window installed within the opening in the building wall; and
- a first pocket section next to the opening and sized at least equally to the opening, the first pocket section overlapping the building wall, the frame comprising:
- an insulating mullion pocket between the opening and the first pocket section; and
- three respective insulating edge pockets within three of the at least four edges of the frame the three of the at least four edges surrounding the opening;
- an insulating section between the first pocket section and one of the first or second sides of the frame; and
- a first sliding insulating glazing unit supported on a bottom edge by roller carts moveable within a raceway of the frame, the first sliding insulating glazing unit capable of sealing the opening and moveable between:
- a fully-closed position in which the first sliding insulating glazing unit is located substantially within the opening and seals the opening; and
- a fully-open position in which the first sliding insulating glazing unit is located substantially within the first pocket section of the frame,
- wherein the first sliding insulating glazing unit comprises two or more glass sheets that are spaced apart and sealed at perimeter edges of glass sheets and features one or more low emissivity coatings facing at least one glazing cavity between the glass sheets and where the center-of-glass provides more thermal resistance than the perimeter edges, and
- wherein in the fully-closed position, the perimeter edges of the first sliding insulating glazing unit are located within the three insulating edge pockets and the insulating mullion pocket of the frame.

9. The energy efficient fenestration assembly installation of claim 8, wherein the first sliding insulating glazing unit comprises a vacuum insulating glass unit.

10. The energy efficient fenestration assembly installation of claim 8, wherein the energy efficient fenestration assembly further comprises a second insulating section located on the other side of the first pocket section from the insulating section, wherein the insulating section comprises a stressed skin panel comprising an insulating core and at least one structural skin.

11. The energy efficient fenestration assembly installation of claim 8, wherein the energy efficient fenestration assembly further comprises a first compressible seal located on the frame or on the first sliding insulating glazing unit and sealing the first sliding insulating glazing unit to the frame.

12. The energy efficient fenestration assembly installation of claim 8, wherein the edges of the vacuum insulating glass unit are located about two inches within the three respective insulating edge pockets and the insulating mullion pocket when in the fully closed position.

13. The energy efficient fenestration assembly installation of claim 8, further comprising insulation surrounding exterior edges of the three of the at least four edges of the frame having the insulating edge pockets and the insulating mullion pocket.

14. The energy efficient fenestration assembly installation of claim 13, wherein the insulation surrounding exterior edges of the frame hides the frame from view so that only the glass of the first sliding insulating glazing unit is visible to an observer looking out the opening.

15. The energy efficient fenestration assembly installation of claim 8, wherein perimeter edges of the sliding insulating glazing unit are sealed by compressible rubber seals.

16. The energy efficient fenestration assembly installation of claim 8, wherein the insulating section comprises a stressed skin panel.

17. The energy efficient fenestration assembly installation of claim 8, further comprising a vacuum insulating panel between the first pocket section and the building wall.

18. The energy efficient fenestration assembly installation of claim 8, wherein the energy efficient fenestration assembly further comprises:
   a blind located between the fenestration assembly and the conventional window; and
   an actuator for controlling the position of the blind.

19. The energy efficient fenestration assembly installation of claim 18, wherein the blind is located on an exterior of the conventional window and dynamically controls solar heat.

20. The energy efficient fenestration assembly installation of claim 18, wherein the blind incorporates a low-e coating on one or more surfaces of the blind.

21. The energy efficient fenestration assembly installation of claim 18, wherein one or both glazing surfaces facing the blind feature a low-emissivity coating.

22. The energy efficient fenestration assembly installation of claim 8, wherein the operation of the interior fenestration assembly or conventional window is motorized.

23. The energy efficient fenestration assembly installation of claim 8, wherein the conventional window is a single glazed window.

24. The energy efficient fenestration assembly installation of claim 8, wherein the combined center-of glass performance of the fenestration assembly and the conventional window is about R-14.

25. The energy efficient fenestration assembly installation of claim 8, further comprising a slim line profile adhered to at least one perimeter edges of the insulating glass unit using a sealant material.

26. The energy efficient fenestration assembly installation of claim 8 wherein the building wall comprises additional insulation so that an outer surface of the additional insulation of the wall assembly is in line with an outer surface of the fenestration assembly.

\* \* \* \* \*